(No Model.)
W. B. FEATHERSTONE.
BICYCLE GEAR CHANGING MECHANISM.
No. 598,336. Patented Feb. 1, 1898.
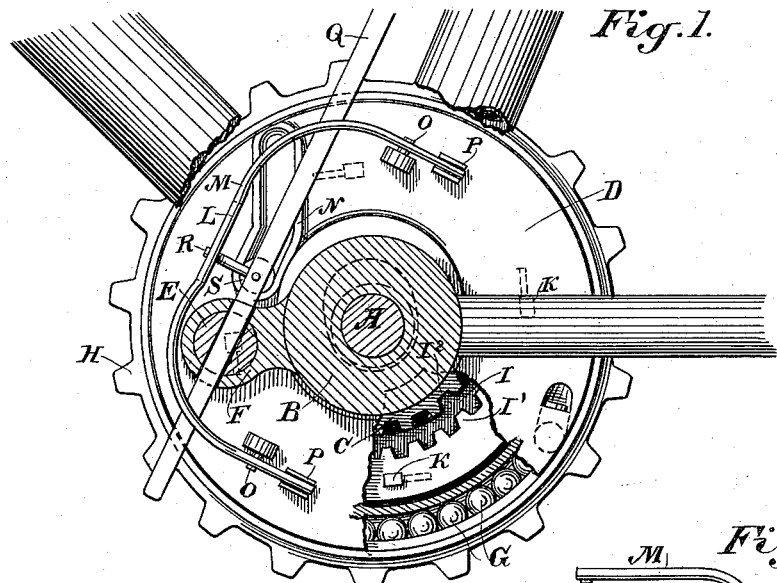
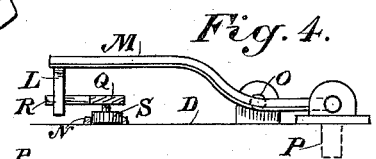
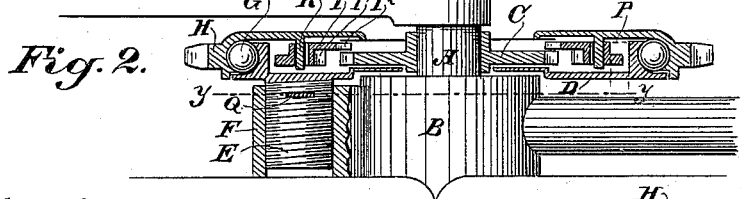
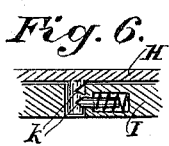
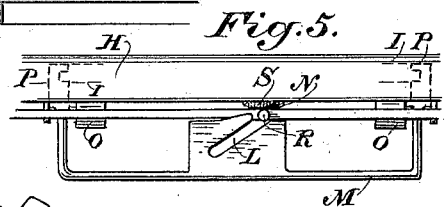
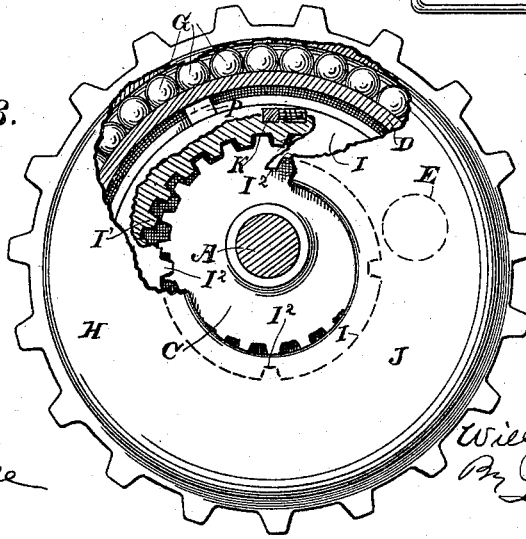
Witnesses,
Inventor,
Willard B. Featherstone
By Dewey & Co.
Attys
THE NORRIS PETERS CO., PHOTO-LITHO., WASHINGTON, D. C.

UNITED STATES PATENT OFFICE.

WILLARD B. FEATHERSTONE, OF SAN FRANCISCO, CALIFORNIA, ASSIGNOR TO THE LO-HI SPROCKET COMPANY, OF SAME PLACE.

BICYCLE-GEAR-CHANGING MECHANISM.

SPECIFICATION forming part of Letters Patent No. 598,336, dated February 1, 1898.

Application filed June 29, 1896. Serial No. 597,355. (No model.)

*To all whom it may concern:*

Be it known that I, WILLARD B. FEATHERSTONE, a citizen of the United States, residing in the city and county of San Francisco, State of California, have invented an Improvement in Bicycle-Gear-Changing Mechanism; and I hereby declare the following to be a full, clear, and exact description of the same.

My invention relates to a device which is especially adapted for changing the gears upon bicycles, tricycles, or any vehicle to which the device can be applied, so that the speed of the driving mechanism may be changed from a higher to a lower, and vice versa.

It consists in certain details of construction which will be more fully explained by reference to the accompanying drawings, in which—

Figure 1 is an outside view, with a part broken away, on line $y\,y$, Fig. 2, showing the ball-bearing of the sprocket-wheel and the laterally-moving disk and the pinion with which it engages. Fig. 2 is a horizontal section taken through the parts in the plane of the axis. Fig. 3 is a view taken from the opposite inner side, showing the mechanism by which the change of gear is effected. Fig. 4 is a side elevation of the device to change the speed. Fig. 5 is a front view of the same. Fig. 6 is a detail of the clutch-pin.

The object of my invention is to provide a simple mechanism for changing from a high to a low or low to a high gear with economy of construction and ease of manipulation.

As I have here illustrated my invention, A is the crank-shaft; B, the crank-bracket, in which the shaft is journaled upon bearings in the usual or any suitable manner. On this shaft, interior to the crank, is fixed a toothed pinion C, so as to turn with the shaft. Exterior to and independent of this pinion is a circular disk D, which is fulcrumed at one side by a pin E in a corresponding socket-piece F, which is formed with or secured to the crank-bracket B. If the apparatus is to be fitted to old machines, this socket-piece can be easily clamped in place upon the frame and bracket, so as to allow the other parts to be properly attached, but in the manufacture of the new machine it will be preferable to form it in one piece with the remainder of the bracket. The pin E is fitted to turn with sufficient freedom within the socket, so as to allow the disk D to be swung around this point of support and stand centrally with relation to the shaft-axis when the machine is driven directly and eccentric thereto when it is driven indirectly and at a lower rate of speed. This pivot-joint may be made in any suitable or well-known manner for the purpose of adjustment and preventing undue lateral play; but I have found a very good way for constructing it is to screw-thread the socket F and the pin E, so that the threads of the screw fit snugly in those of the socket, and as the oscillation of the disk about its center is a very small portion of a circle the movement is not sufficient to appreciably alter the relative position of the various parts, while by reason of the many bearings of the screw-threads the joint will remain very rigid and stiff.

The outer periphery of the disk D is channeled to form a race, into which balls G are fitted, and exterior to these balls is fitted the sprocket-wheel H, having the teeth for the driving-chain upon the outer periphery, and a concaved interior race between which and the part D the balls G are fitted to run. This allows the sprocket-wheel to be rotated independently of and around the disk D, and by reason of the balls it is also supported independently of the shaft A, so that much of the strain upon the driving-chain is borne by the balls G. The oscillation of these parts about the fulcrum-pin E is essentially transverse to the line of travel of the driving-chain, and its tension is not affected to a noticeable extent by these movements in changing the gear.

I is a clutch-disk made of thin sheet-steel, having a toothed opening around its inner periphery of such size that its teeth may be made to engage those of the pinion C when it is in line therewith and form a uniting-clutch, and this clutch may be also moved axially or to one side until it is entirely disengaged from the teeth of the pinion C. This clutch flange or disk is formed with or fixed to an internally-toothed gear I' of larger diameter than the clutch-disk.

When the teeth of the clutch I engage those of the pinion C, the sprocket-wheel and intermediate parts all turn about a common axis and power applied to the crank-shaft A will turn the pinion and will directly rotate the clutch I, and through its connection with the exterior sprocket-wheel H will also turn that, so that a driving-chain passing around said sprocket-wheel and thence to the sprocket of the wheel to be driven will act to propel said wheel in the direct proportion of the diameters of the two sprocket-wheels. In other words, the sprocket-wheel H will be driven the same number of revolutions as the crank and crank-shaft, thus making a direct application of the power.

The sprocket-wheel H has an inwardly-projecting flange J, which overlaps the clutch I and the internal gear I', and has pins or lugs K projecting from or through it and extending into corresponding sockets in the outer face of the gear I', so that the gear is rotated coincidently with the sprocket-wheel.

The internal gear I' is of considerably larger diameter than the pinion C, and its teeth are adapted to engage with the teeth upon the pinion C when the disk D, together with the sprocket-wheel H, and the disk I are moved about the fulcrum-pin E, so as to bring the teeth I' in contact with the teeth of the gear-wheel C, thus forming an internal gear in which the power applied to the crank acts through the pinion C and thence through the internal gear-teeth to drive the exterior parts of the sprocket-wheel at a slower rate of speed than when the driving is direct.

The rate of speed will vary with the difference in the diameters of the pinion and the internal gear and may be made to suit the requirements of the machine.

It will be manifest that in order to engage the pinion C with the internal teeth of the flanged or clutch portion of the disk I it will be necessary for these teeth to stand in the plane of the pinion-teeth and be engaged with them, and in order to engage the internal gear-teeth I' with the pinion-teeth it will be necessary to first move the disk I outwardly, so as to disengage the teeth $I^2$ from the pinion and allow the whole exterior device to be turned about its eccentrically-placed pin E. In order to effect this movement, I have shown two cams, one of which, L, is connected with a curved yoke or bail M, and the other, N, is formed on or fixed to the back of the disk D. The yoke M is fulcrumed at points O upon the back of the disk D, and its ends project beyond the fulcrum and are connected with slotted lugs or pins P, which extend through the back of the disk D and are connected directly with the clutch and internal gear I I', so that as the yoke M is rocked about its fulcrum-points its ends and the connections P will be moved in or out, carrying with them the gear I' and clutch I and moving it to such a distance as either to bring the clutch I into line with the teeth of the pinion C or move them outwardly clear of the pinion, so that the mechanism may be tilted about the pivot-pin E until the internal gear-teeth I' engage with the pinion C.

In order to operate the device, I have shown a vertically-sliding rod Q, having a handle at the upper end and guided so that the handle is within easy reach of the rider upon his seat. This sliding rod Q carries upon it a pin R, which projects so that it will engage with the cam-slot L. When the rod Q is pushed downwardly, this pin will act to move the cam-plate toward the disks, thus tilting the opposite ends of the yoke M and drawing the disk I into such position that the clutch $I^2$ will engage the teeth of the pinion C. When the rod Q is moved in the opposite direction, the opposite movement of the bail or yoke M is produced, and the clutch $I^2$ is forced outwardly until the teeth have been disengaged from those of the pinion C, and the latter then stand in the same plane with the teeth I' of the internal gear. The rod Q also carries a slide or roller S, which is adapted to engage the curved sides of the cam N upon the back of the disk D. This occurs after the pin R has left the cam-slot L, and the whole device is then tilted by the action of the lug or roller S in the cam N, so that, turning upon its pivot-pin E, it will be thrown into an eccentric position with relation to the pinion C, and the teeth of the pinion will then be caused to engage with the teeth I' of the internal gear of larger diameter and thus rotate the disk I and the connected sprocket-wheel H at a slower rate of speed than when the parts have a common center and are directly connected. This enables me to apply a two-speed gear to bicycles and other vehicles to which it may be applicable and to easily change from one speed to the other while the machine is in motion.

A thin flange extends inwardly toward the center from the sprocket-disk H on the outer or crank side of the apparatus, and by means of an elastic disk fixed around the center and pressing thereon dust is prevented from entering at this point, the elasticity of the disk being such as to allow any necessary movements of the parts. A similar disk formed with and extending toward the center from the part D overlaps the inner face of the pinion C and will prevent dust from entering at this point, or other suitable device may be used, thus making the interior of the casing containing the moving parts as approximately dust-proof.

To prevent the clutch from being accidentally disengaged from the pinion C or any undesirable side movement, the backs of the lugs K may have V-shaped grooves $k$ made in them, and similarly-shaped spring-catches are fitted into chambers in the adjacent parts of the internal gear-disk, so that when the gear is moved to one side to engage the clutch I and pinion C the catch will engage one of these notches, and when shifted so that the gear I' will be in line to engage the pinion the other notch will be engaged.

Having thus described my invention, what I claim as new, and desire to secure by Letters Patent, is—

1. A changeable-speed gear consisting of a toothed pinion fixed upon the crank-shaft, a disk exterior to said pinion having two internal toothed diameters, of different sizes, one of which coincides with and clutches the pinion when turned upon the same center and the other is to engage the pinion when the parts are turned to stand eccentric to the crank-shaft axle, an exterior sprocket-wheel having laterally-projecting pins or lugs on which the double-toothed disk is slidable and by means of which the said disk is connected directly with the sprocket-wheel so that both revolve together, a second disk interior to the sprocket-wheel, having an open center and a channeled periphery, a ball-bearing between this channeled periphery and a corresponding inner periphery of the sprocket-wheel, a pin projecting laterally from one side of the center of the inner disk and adapted to enter a socket in the crank-bracket and form an eccentric axis for said disk, and a rocking yoke and cam mechanism for shifting the double-toothed disk and swinging the interior disk about its eccentric pivot-pin.

2. The combination of a sprocket-wheel and an open center, interior concentric disk D, a ball-bearing between said wheel and disk and a pin or stud eccentrically pivoting the interior disk to the crank-bracket, a gear-wheel fixed upon the crank-shaft and a disk I interior to the sprocket-wheel having two internal toothed diameters, of different sizes, said last-named disk slidable on pins or lugs on the interior of the sprocket-wheel, means for turning the open-center disk about its eccentric center whereby the gear-wheel may be made to engage with either of the toothed surfaces of the disk I, and means for sliding the disk I on its bearings consisting of a rocking yoke fulcrumed to the disk and having one end connected with said disk I and a cam mechanism for operating the opposite portion of said yoke.

3. A changeable gear for bicycles, consisting of a crank-shaft, a pinion fixed thereon, a disk exterior to the pinion having one toothed diameter coinciding with that of the pinion whereby when engaged the disk turns upon the same center with the crank-shaft, a second diameter larger than the first having internal gear-teeth, a sprocket-wheel with which this disk is connected by lugs so as to revolve together, a disk pivoted to the frame of the machine having a groove upon its periphery, a corresponding groove upon the interior periphery of the sprocket-wheels and balls fitting in said grooves forming a bearing upon which the sprocket-wheel turns independently of the disk, a slidable bar adapted to be operated from the rider's seat, with lugs or rollers fixed thereto and movable therewith, a yoke having a diagonal cam-groove into which one of the lugs of the sliding bar is adapted to enter said yoke being fulcrumed upon the disk D, and pins by which its outer movable ends are connected with the internally-toothed disk whereby the latter is moved in the line of its axis so that the clutch-teeth may engage the pinion to produce direct driving, or to disengage said teeth and allow the internal gear to engage the pinion to change its speed.

4. A changeable gear consisting of a crank-shaft having a pinion fixed thereon, a disk exterior thereto having two different diameters, one of which forms a clutch to engage the pinion when both have a common center of rotation, a larger internal gear at one side of the clutch-flange, a disk eccentrically pivoted to the frame, said disk concentric with and forming a bearing about which an exterior sprocket-wheel is turnable, lugs by which said sprocket-wheel is connected with the internally-toothed disk, a mechanism by which the disk is moved upon its longitudinal axis so as to first disengage the smaller circle of teeth from the pinion, and secondly to turn the eccentric disk about its fulcrum-point to engage the larger internal teeth of the disk with the pinion and produce a slower movement.

In witness whereof I have hereunto set my hand.

WILLARD B. FEATHERSTONE.

Witnesses:
S. H. NOURSE,
JESSIE C. BRODIE.